UNITED STATES PATENT OFFICE.

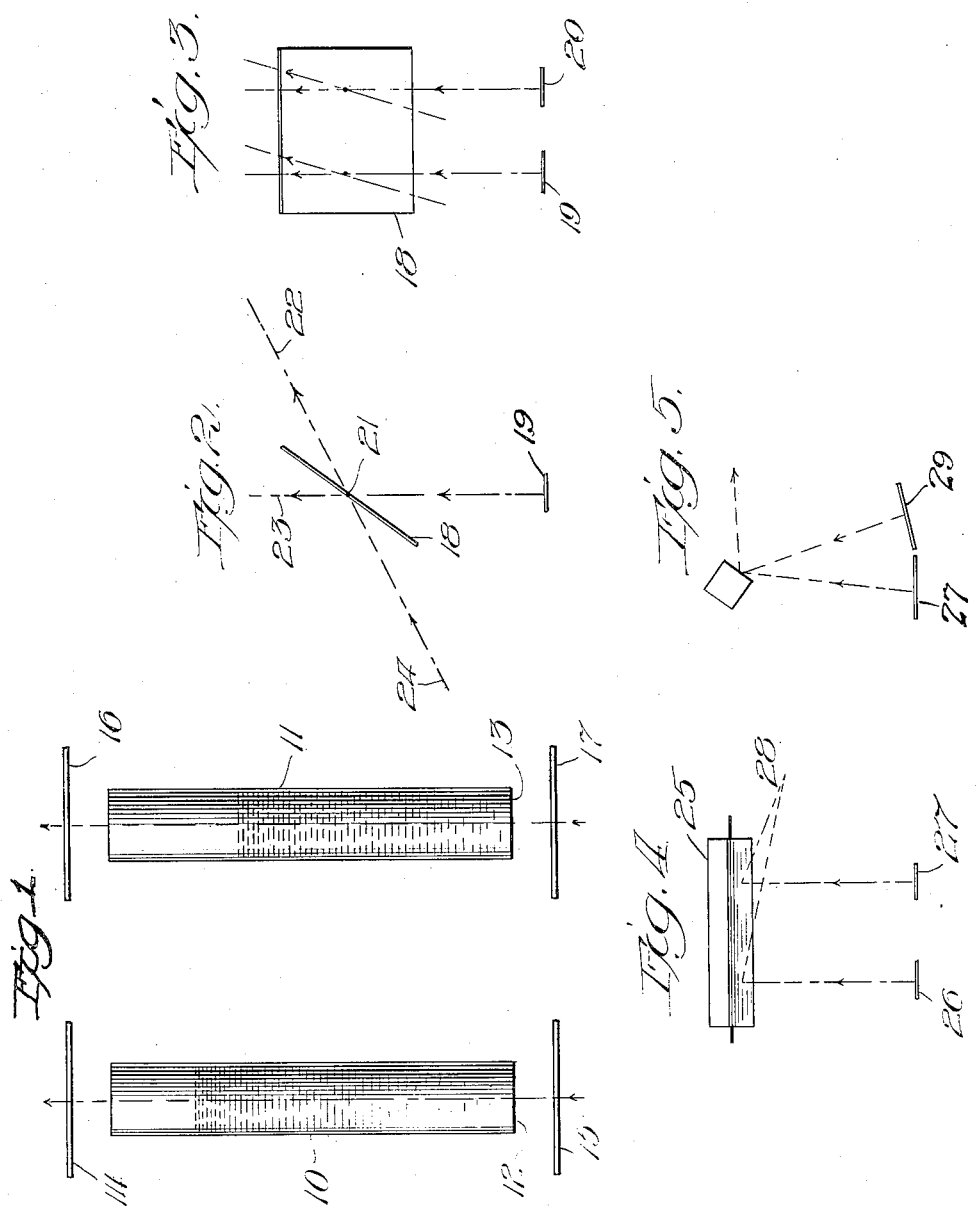

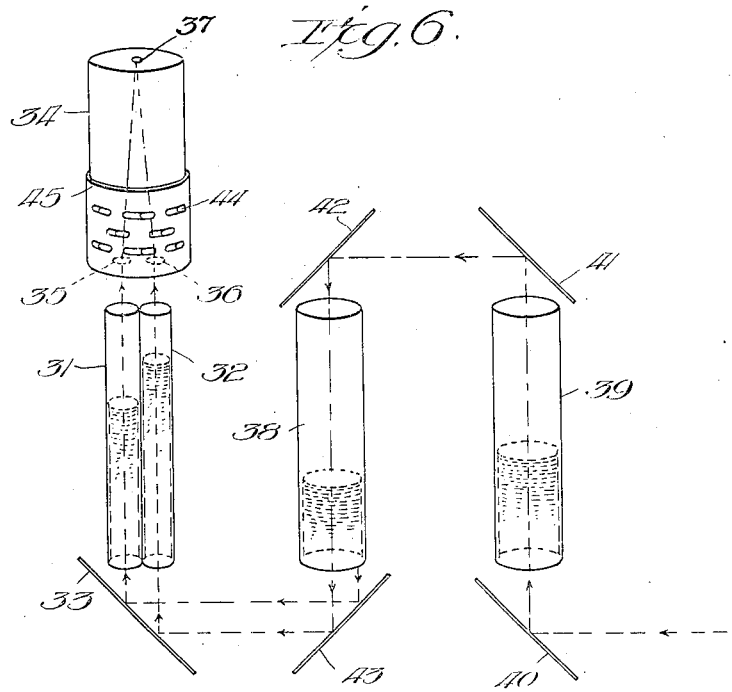

MELVIN MOONEY, OF CHICAGO, ILLINOIS.

COLORIMETER AND THE LIKE.

1,389,836.

Specification of Letters Patent.   Patented Sept. 6, 1921.

Application filed July 7, 1919.  Serial No. 309,107.

*To all whom it may concern:*

Be it known that I, MELVIN MOONEY, a citizen of the United States, residing at Chicago, in the county of Cook and State of Illinois, have invented certain new and useful Improvements in Colorimeters and the like, of which the following is a specification.

The present invention has to do with improvements in colorimeters or instruments for measuring or comparing colors of bodies so that the kind and density of the color can be determined. Instruments of this kind are used for measuring or comparing the colors of various bodies, which may be either liquid or solid, transparent or opaque, and they are often very extensively used in many industrial applications, including, for example, the manufacture of paints and dyes, steel analysis, and the refining of cotton seed oil. The type of instrument to be presently disclosed and to which this invention particularly relates is peculiarly well adapted for measuring or comparing the colors of liquids, but in mentioning this or any other particular application of the features of the invention I wish it clearly understood that I do not thereby intend to in any wise limit myself as to the application or usefulness of the invention, except as I may do so in the claims.

In the comparison or measurement of colors in instruments of the type under discussion, the decision or result arrived at depends entirely upon the judgment of the observer. This judgment is based on the physiological and psychological effects of the light coming from the instrument and falling on the observer's eye, and is therefore influenced, either favorably or unfavorably, by any factor which influences these physiological and psychological effects. Consequently to be most successful, the instrument must be designed so as to make use of favorable factors as much as possible and to avoid unfavorable factors.

Experience tends to show that slight differences in color depth between two colors may be more easily and more accurately detected if the two colors are white or gray or nearly white or gray than if they are of a deep color. For example, it is possible to detect a smaller difference in color depth between a white or neutral gray and a very light pink than between a deep red and another red only slightly deeper. In other words, if some color almost white or gray be compared with a white or gray, a more accurate and certain comparison may be effected than if the comparison be made between deeper colors.

Bearing the foregoing in mind, I will state at this point that in principle the use and operation of the instrument to which the present invention relates involves the combining or associating of such colors with the test colors that the comparison actually made by the operator may be a comparison between colors actually white or nearly white or gray rather than between deeper colors. That is to say, I combine or associate each of the colors under observation, and which are to be compared, with other complementary colors, so that the comparison actually made is between whites or nearly whites or grays.

In further regard to the factors influencing the physiological and psychological effects, I will say that the nature of the background, or the area surrounding the colors under observation, will also influence the accuracy and ease of the observer's judgments. The most favorable background is one which, in color, is white or neutral gray, and in light intensity is the same as the colors being compared. In some instances, then, provision is made in the instrument for obtaining such a background.

Bearing all the foregoing facts in mind,

In the drawings:

Figure 1 shows diagrammatically a simple type of instrument embodying the features of the present invention;

Fig. 2 shows diagrammatically another simple type of instrument embodying the features of the present invention;

Fig. 3 shows another view of the arrangement illustrated in Fig. 2, but taken at right angles thereto;

Fig. 4 shows a view of another modified form of instrument;

Fig. 5 shows a view of the instrument of Fig. 4, taken at right angles to said figure; and Fig. 6 shows diagrammatically another embodiment of the features of my invention.

Referring to the drawings, I will first explain the method or principle of color testing embodying the present invention by reference to the arrangements shown diagrammatically in Figs. 1 to 5 inclusive, and will then explain the arrangement shown in Fig. 6.

Referring to Fig. 1, the same shows a pair of tubes or columns 10 and 11, preferably placed in an upright position, as illustrated, although in certain cases horizontal or other positions might be used with equal facility. These tubes or columns have their lower ends 12 and 13 of glass or other transparent material, so that light may pass longitudinally through them, as illustrated by the dotted arrows. Ordinarily the comparison will be effected between different colored liquids, and therefore I have illustrated said liquids as being contained in the tubes.

Observations are to be made at the top ends of the tubes so that the observer sees the light as it emerges after having passed through the liquids.

Assuming that in the path of the light traveling through the tube 10, and at the point 14 or 15 there be inserted a transparent material, such as a colored glass or a container of colored liquid, of such color that the light which passes through the same in succession with the liquid contained in the tube 10 be colorless, we shall have a condition in which the colors complement each other and produce white light at the position of observation. If now we insert in the path of travel of light passing through the tube 11 and its material, and either at the point 16 or 17 another such plate or material as was formerly placed in the path of travel of the light passing through the tube 10, and then adjust the height of the liquid in the tube 11 so that the observed light is white or colorless and equal in brightness to the light coming from the tube 10, we will known that the two colors in the tubes 10 and 11 are of the same color and shade.

In this way a comparison has been effected between the materials in the two tubes, and we have definite knowledge that they are of the same color and shade, and said knowledge is gained under the most advantageous and favorable conditions, bearing in mind the physiological conditions of the problem.

Referring now to the arrangement shown in Figs. 2 and 3, I have therein illustrated a glass plate or the like 18, which may be of generally rectangular form, as shown in Fig. 3, which is a view at right angles to Fig. 2. The two colors to be matched are the colors of the plates 19 and 20, for example. Assume that the glass plate 19 is so adjusted that the light passing through the plate 19 will strike it at such an angle (about 15–20°) that about half of the light is reflected in the direction of the line 21—22, and the other half of the light passes through in the direction 21—23. At the point 24 is another source of light so placed that the angle 24—21—18 equals the angle 18—21—19, or 18—21—20. Then about half of the light from the source 24 will pass through the glass in the direction 21—22, and the other half will be reflected in the direction 21—23. The combined light from 19 and 24 will be viewed in the beam 21—22. 24 is adjusted so that its light, combined with that coming from 19, is viewed as colorless light. Then at the point 20 is placed a colored plate or material of such color that when combined with the light coming from the source 24, as previously adjusted, there is colorless light. The observer then has knowledge that the plates or materials 19 and 20 are of the same color and shade.

Considering now the arrangement shown in Figs. 4 and 5, this is such that the combination of the light from the different sources is done mechanically by a rotating mirror. In this case I have illustrated a four-faced mirror 25 pivoted to rotate on its longitudinal axis, Figs. 4 and 5 being viewed at right angles with respect to each other. The two colors to be matched are illustrated as the plates 26 and 27. Light passing through these plates strikes the mirror and is reflected off in the direction of the observation point 28. As the mirror rotates, the light coming through the plate or materials 26 and 27 will be observed as a series of successive repeatedly recurring impulses.

Adjacent to the plates 26 and 27 are two other plates 29 and 30, plate 30 being in line with and behind the plate 29 in Fig. 5. The plate 29 is so positioned that light passing through it will travel in the same plane as the reflected beam from the plate 26, and the plate 30 is so positioned that light traveling through it will travel in the same way as the beam from the plate 27.

Assuming that the plates 29 and 30 are one and the same plate, or that they are both exactly the same color and shade, then if this plate be of such color that the light passing through the plate or material 26 and fused with that coming from the plate 29—30 is white light, and if then the plate or material 27 be so adjusted that light passing through it and fused with light from the plate 29—30 is white light, the observer will have assurance that the plates or materials 26 and 27 are of the same color and shade.

Referring to the arrangement shown in Fig. 6, in this case there is provided a pair of parallel tubes or the like 31 and 32 for holding the liquids whose colors are to be compared. These may be circular in form, as illustrated, or may be of any other suitable form. Light enters their lower portions, being directed thereinto by means of a mirror 33, and passes up through the liquids in the tubes in two parallel beams, Above the upper ends of these tubes is an eye piece or observation member 34. The same may be formed of any suitable material, such as sheet metal or the like. In its bottom it is provided with a pair of openings 35 and 36, through which the light beams enter. A perforation 37 in the top serves to permit observation of the interior of the eye piece.

The beam of light striking the mirror 33 is adjusted to that color complementary to the color of the material within the tube 31. For this purpose I have illustrated two color tubes 38 and 39, respectively, which, in conjunction with the mirrors 40, 41, 42 and 43, receive the beam of white light and transfer it to the mirror 33 and transform it into the complementary color mentioned. This transformation is effected by a proper choice of the color liquids in the tubes 38 and 39, and by a proper regulation of the height of the liquid columns in the tubes. When this complementary color has been established, the light coming from the tube 31, and observed at 37, will be white or neutral gray. Then the liquid in the tube 32 is varied until the light coming from it is also white and matches the light coming from the tube 31, whereupon there will be assurance that the colors in the tubes 31 and 32 are both the same.

It was previously mentioned that the comparison of colors can be most accurately made when the colors are white or gray, and when the comparison is made on a white background or within a space in which the intensity of light is not greatly different from the intensity of the lights under comparison. This arrangement is provided by the use of the chamber 34, the inner surface of which is white. Around the lower portion of the chamber 34 is a series of slits 44, through which light may be admitted to said chamber. A sleeve 45 is slidably mounted around the slitted portion of the chamber 34, and said sleeve is provided with companion slits which may be brought more or less into register with the slits 44 or may be caused to cover over said slits to a greater or less extent. In this way the intensity of the light within the chamber may be modified to approximate the intensity of the lights under comparison.

While I have herein illustrated and described only certain embodiments of the features of my invention, still I do not limit myself to said embodiments, except as I may do so in the claims.

I claim:

1. In an apparatus of the class described, the combination of a pair of vertical cylindrical tubes for liquids whose colors are to be compared, means for directing parallel beams of light into the lower ends of said tubes to cause the same to pass longitudinally through them, an eye piece for observing light emerging from the upper ends of said tubes, said eye piece comprising a chamber whitened on its interior and having light openings in its bottom portion for the beams of light coming from the two tubes, and having an observation opening in its upper end, and having variable openings for the admission of light through its side portions, and means for varying the color of light admitted to the lower ends of said vertical tubes, comprising two tubes for colored liquids in tandem with each other and suitable mirrors for directing the beam of light through said tubes in tandem and then through the vertical tubes aforesaid, substantially as described.

2. An apparatus of the class described, comprising a pair of vertical tubes for colored liquids which are to be compared, an observation piece adjacent to the upper ends of said tubes and having bottom openings for the admission of beams of light from the upper ends of said tubes to its interior, the interior of said observation member being whitened, an observation opening in the upper end of said member, means for admitting light through the sides of said observation member in quantities under control, and means in tandem with said tubes for varying the color and intensity of light delivered to the lower ends of said tubes, substantially as described.

3. An apparatus of the class described, comprising a pair of vertical tubes for colored liquids which are to be compared, an observation piece adjacent to the upper ends of said tubes and having bottom openings for the admission of beams of light from the upper ends of said tubes to its interior, and means in tandem with said tubes for varying the color of light to be delivered to the lower ends of the tubes, substantially as described.

4. An apparatus of the class described comprising a pair of vertical tubes for colored liquids which are to be compared, a common observation piece adjacent to the upper ends of said tubes and adapted to receive light from both of the tubes for comparison purposes, and means adjacent to the lower ends of the tubes for controllably modifying the color of light admitted to said lower ends to bring the light observed from one tube to white or gray, the elevation of liquid in the other tube being variable to bring the light observed therefrom also to white or gray, substantially as described.

5. The combination with a container for liquid whose color is to be measured, of another container for liquid of known color strength, means for delivering to both of said containers light of the same color and which is complementary to the color of the liquid in one container, the elevation of the liquid in the other container being variable to bring light emitted therefrom to white or gray, substantially as described.

6. The method of testing a material to ascertain its color which consists in combining the color of the material with its complementary color, and also combining the same complementary color with a standard of comparison such as to produce gray light, to thereby produce gray light in both instances, and which consists in simultaneously observing both of said gray lights so produced for purposes of comparison, whereby the standard of comparison becomes a measure of the color of the material under test, substantially as described.

MELVIN MOONEY.